US011514542B2

(12) United States Patent
Sohmshetty et al.

(10) Patent No.: US 11,514,542 B2
(45) Date of Patent: Nov. 29, 2022

(54) SMART CONTAINERS AND SYSTEMS AND METHODS FOR SHIPPING AND TRACKING SMART CONTAINERS

(71) Applicant: Ford Global Technologies, LLC, Dearborn, MI (US)

(72) Inventors: Raj Sohmshetty, Canton, MI (US); Peter Friedman, Ann Arbor, MI (US); Pramita Mitra, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 142 days.

(21) Appl. No.: 17/003,797

(22) Filed: Aug. 26, 2020

(65) Prior Publication Data

US 2022/0067865 A1 Mar. 3, 2022

(51) Int. Cl.
| | |
|---|---|
| *G06Q 50/28* | (2012.01) |
| *G06Q 30/00* | (2012.01) |
| *G06K 7/14* | (2006.01) |
| *G07C 9/21* | (2020.01) |
| *B65D 55/02* | (2006.01) |
| *H04L 9/30* | (2006.01) |
| *H04L 9/00* | (2022.01) |

(52) U.S. Cl.
CPC .............. *G06Q 50/28* (2013.01); *B65D 55/02* (2013.01); *G06K 7/1417* (2013.01); *G06Q 30/0185* (2013.01); *G07C 9/21* (2020.01); *H04L 9/30* (2013.01); *G06Q 2220/00* (2013.01); *H04L 9/50* (2022.05)

(58) Field of Classification Search
CPC .... G06Q 50/28; B65D 55/02; H04L 2209/38; H04L 9/30; H04L 9/50; G06K 7/1417; G07C 2009/0092
See application file for complete search history.

(56) References Cited

U.S. PATENT DOCUMENTS 9,336,505 B1 * 5/2016 Meyers ............... G06Q 10/083
10,192,198 B2 1/2019 Nazzari et al.
(Continued)

FOREIGN PATENT DOCUMENTS

| CN | 107476824 | * | 12/2017 | ......... H01H 36/0006 |
| EP | 3702986 | * | 2/2020 | ............. G06Q 10/08 |

(Continued)

OTHER PUBLICATIONS

Joydeep, "Track and Trace Using IoT and Blockchain", TRINAMIX, Aug. 19, 2019, 12 pages.

*Primary Examiner* — Vernal U Brown
(74) *Attorney, Agent, or Firm* — Brandon Hicks; Eversheds Sutherland (US) LLP

(57) ABSTRACT

Systems and methods for tracking a smart container are provided. The methods use sensors of the smart container to detect tampering with the smart container after the container leaves a sender and before the container arrives at a receiver. In particular, the sensors detect when the smart container has been opened by someone other than the receiver (i.e., tampered with) and write the detection of tampering (e.g., the sensor measurement) to a blockchain. Delivery agents use scanners to write their possession or agency over the smart container to the blockchain. Accordingly, the agency of the smart container can be determined if tampering occurs.

17 Claims, 4 Drawing Sheets

(56) References Cited

U.S. PATENT DOCUMENTS

2018/0096175 A1\* 4/2018 Schmeling .............. B29C 64/10
2018/0205682 A1   7/2018 O'Brien et al.
2021/0125507 A1\* 4/2021 Haider ................. G08G 5/0082
2022/0014388 A1\* 1/2022 Klink .................... H04W 12/63

FOREIGN PATENT DOCUMENTS

JP        2004011313      \*  1/2004   ............. G08B 13/06
WO    WO2008003301   \*  1/2008   ............. G08B 13/06

\* cited by examiner

SMART CONTAINERS AND SYSTEMS AND METHODS FOR SHIPPING AND TRACKING SMART CONTAINERS

BACKGROUND

Shipping and tracking valuable items can pose a number of challenges. In particular, valuable items may have a higher risk of fraud and tampering and a delivery and tracking chain having multiple agents can make tracking difficult. A receiver may want to know the source of an item for purposes of authentication and may want to know who is responsible for tampering with the item, stealing the item, or damaging the item so that the proper agent can be held liable. It is with respect to these and other considerations that the disclosure made herein is presented.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The disclosure provides systems and methods for tracking a smart container. The methods use sensors of the smart container to detect tampering with the smart container after the container leaves a sender and before the container arrives at a receiver. In particular, the sensors detect when the smart container has been opened by someone other than the receiver (i.e., tampered with) and write the detection of tampering (e.g., the sensor measurement) to a blockchain. Delivery agents use scanners to write their possession or agency over the smart container to the blockchain. Accordingly, the agency of the smart container can be determined if tampering occurs.

Illustrative Embodiments

The disclosure will be described more fully hereinafter with reference to the accompanying drawings, in which exemplary embodiments of the disclosure are shown, and not intended to be limiting.

Figure 1:
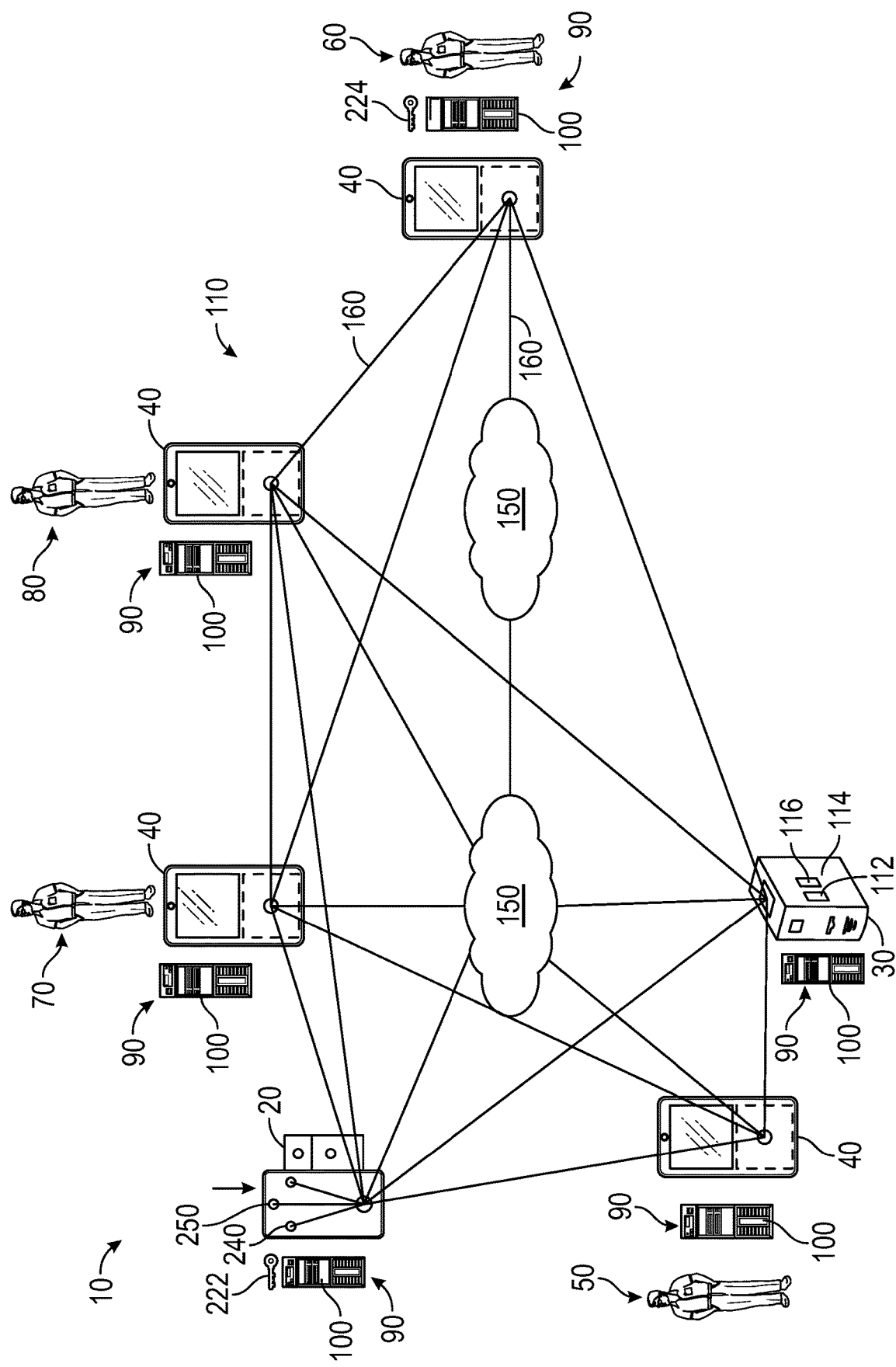
FIG. 1 illustrates an example network including a smart container and a number of scanner devices in accordance with the present disclosure.

FIG. 1 illustrates an exemplary network 10 with nodes including a smart container 20, a server 30, and a plurality of scanner devices 40. The scanner devices 40 may be associated with a sender 50, a receiver 60, and one or more agents. The one or more agents transfer the smart container 20 from the sender 50 to the receiver 60. In FIG. 1, agents include a first agent 70 a second agent 80.

In addition, sensors (e.g., sensors 240, 250 of the smart container 20 described in further detail below) may be configured as independent nodes of the network 10. The nodes of the network 10 may be directly connected to one another or indirectly connected to one another via other nodes or communication networks.

As an example, the network 10 is configured as a blockchain network. In blockchain, information exists and is reconciled as a shared database (e.g., each of the nodes of the network have a copy 90 of the blockchain 100), with no central data store. Instead, each record is stored as a "block", which contains record information, a timestamp, and a link to a previous block. As blocks cannot be changed once they are created, the blockchain 100 provides that the possession and tampering data is immutable.

The nodes are configured to write and/or read information pertaining to the blockchain 100. For example, writing to the blockchain 100 can include signing transactions and reading can include analyzing information on the blockchain 100. Some "edge" nodes may delegate reading or writing operations to other nodes. In particular, the sensors 240, 250 of the smart container 20 may delegate reading and writing operations to a communication module 260 of the smart container 20 as it has more computational capacity. In some examples, sensors may be configured to write to the blockchain 100 but not read from the blockchain 100.

When a node writes data to the blockchain 100, the data includes a cryptographic signature that can be verified or authenticated (e.g., by the server 30) before the data is written to the blockchain 100. Authentication prevents an unauthorized source from writing data to the blockchain 100 that may show tampering or a change in agency, as described in further detail below.

For example, when an agent is added to the one or more agents that are responsible to ship the smart container 20 from the sender 50 to the receiver 60, a new blockchain address is created by the server 30 along with public and private keys for the agent. The agent is authenticated through a number of public/private key encrypted handshake communications (e.g., using a hash and the blockchain address). Once authenticated, the agent can write data to the blockchain (e.g., the data is signed using one or more shared encryption keys).

The server 30 (e.g., one or more servers) may be part of a cloud-based computing infrastructure, and may be associated with and/or include a Telematics Service Delivery Network (SDN) that provides digital data services to the smart container 20 and scanner devices 40.

The server 30 includes a processor 112 and a memory 114. The memory 114 includes a server application 116 including program instructions that, when executed by the processor 112, performs aspects of the disclosed methods including analyzing measurements from sensors of the smart container 20 to determine if contents of the smart container 20 are present or if tampering has occurred. As such, the server 30 and server application 116 may be part of a tracking and tamper detection system 110 described in further detail below or may transmit information for such systems.

The server 30 may be the node of the network 10 that is responsible for creating the blockchain 100 and authenticating the nodes that are added to the network 10 and can write or read from the blockchain 100.

The server 30 may perform various aspects of the methods including those described below as being performed by the smart container 20. The server 30 may further be responsible for analysis of the information provided to the blockchain 100.

The nodes of the network 10 may be communicatively coupled to one another via one or more communication networks 150, and may communicate over the communication networks 150 via one or more wireless channels 160. The communication network 150 illustrates an example communication infrastructure in which the connected devices discussed in various embodiments of this disclosure may communicate.

The communication network 150 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), Fifth Generation (5G), near field communication (NFC) protocols, and other possible data connection and sharing techniques to name a few examples.

The smart container 20, the server 30, and the scanner devices 40 also receive and/or are in communication with a Global Positioning System (GPS).

Figure 2:
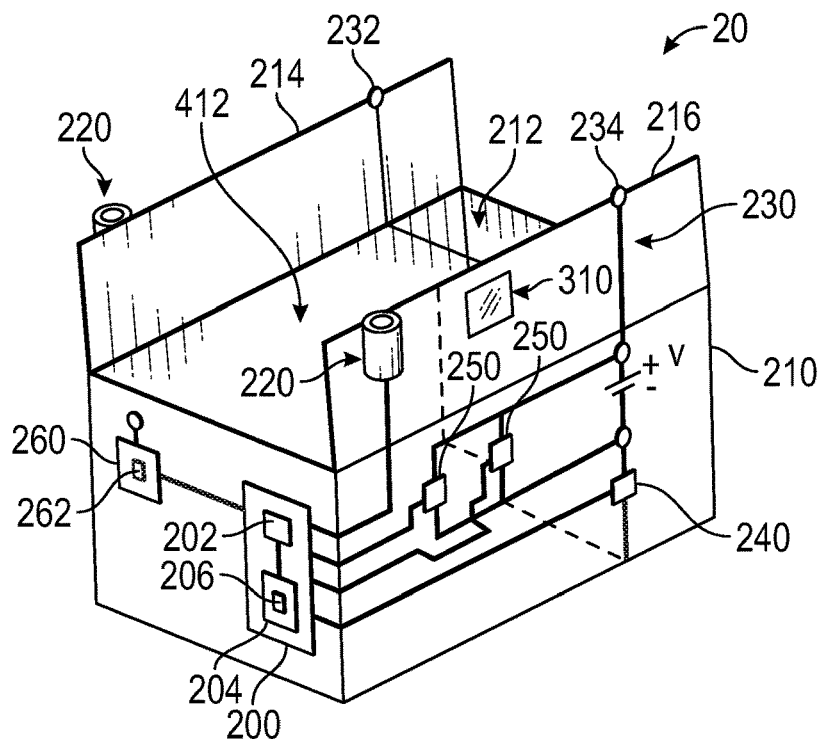
FIG. 2 illustrates an example smart container in accordance with the present disclosure.

FIG. 2 illustrates the smart container 20 in greater detail.

The smart container 20 includes a computer 200 including a processor 202 and a memory 204. The memory 204 stores a container application 206 including program instructions that, when executed by the processor 202, performs aspects of the disclosed methods described below including controlling a lock; generating an unlock code, accessing a public key of the receiver, encoding the unlock code with public key, and writing the encoded code to the blockchain; receiving measurements from the sensors and writing the measurements to the blockchain via the communication module; and analyzing the measurements to verify the presence of contents and to determine indications of tampering, and writing the indications to the blockchain. As such, the smart container 20 and container application 206 may be part of a tracking and tamper detection system 110 described in further detail below including transmitting information for such systems.

The memory may be a non-transitory computer-readable memory storing program code. The memory can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The smart container 20 is illustrated as having a body 210, a top opening 212, and two flaps 214, 216 or doors that are hingedly connected to the body 210. The flaps 214, 216 can be positioned to open and close the top opening 212.

In other examples, a smart container may have a single top flap or take the form of another type of container known in the art.

The smart container 20 includes a lock 220 that is configured to lock the flaps 214, 216 in a closed position over the top opening 212. In particular, the flaps 214, 216 are locked to one another by the lock 220.

The lock 220 may be controlled by the application 206. In particular, the application 206 may set the lock 220 and generate a code to unlock the lock 220. The code may be only known to the receiver 60. To generate the code (e.g., a one-time code), the code may be randomly generated or otherwise determined. The code is encrypted by the application 206 with a public key 222 of the receiver 60. The application 206 writes the encrypted code to the blockchain 100 or transmits the encrypted code directly to the receiver 60 (e.g., the receiver's scanner 40). As described in further detail below, the receiver 60 decrypts the encrypted code with a private key 224 of the receiver 60 and enters the code to unlock the lock 220.

The flaps 214, 216 include a circuit 230. When the flaps 214, 216 are closed, the ends 232, 234 of the circuit 230 connect to close at least part of the circuit 230 (e.g., closing a switch). When the flaps 214, 216 are open, the ends 232, 234 of the circuit 230 are spaced apart to open at least part of the circuit 230.

Closing the circuit 230 may provide power to at least some of the sensors 240 such that the sensors 240 operate when the flaps 214, 216 are closed and cease to operate when the flaps 214, 216 are open. For example, closing the circuit 230 can alter the voltage and/or current through at least part of the circuit 230 such that a measurement of voltage and/or current at the location by the sensor 240 (e.g., a change in voltage or current) reflects whether the flaps 214, 216 are open or closed.

Other elements of the smart container 20 (e.g., sensors 250, the computer 200, and a communication module 260 described in further detail below) may be located on a part of the circuit 230 that is continuously powered or independently powered. As such, the smart container 20 can continue to write to the blockchain 100 when the flaps 214, 216 are open (e.g., part of the circuit 230 is open). At least some of the sensors 250 may be continuously powered to continue to make measurements when the flaps 214, 216 are open.

Measurements by the sensors 240, 250 can be used by algorithms of the container application 206 or by the server 30 to verify the presence of the contents, indicate the state (e.g., open or closed) of the smart container 20, and determine whether any tampering has occurred. For example, tampering can be determined where all or part of the contents are missing and/or where the flaps 214, 216 have been opened (or an opening has been created in a wall of the body 210 of the smart container 20) before the receiver 60 has entered the code to unlock the lock 220.

The sensors can include an optical camera, a load sensor, a thermal camera, temperature sensor, a light sensor, a GPS receiver 262, a voltage sensor, a current sensor, combinations thereof, and the like.

The optical camera may capture an image of the inside of the smart container 20 that can be used to determine whether the contents identified in the blockchain 100 are present in the smart container 20. Similarly, depending on the thermal profile of the contents, the thermal camera may capture an image of the inside of the smart container 20 that can be used to determine whether the contents identified in the blockchain 100 are present in the smart container 20.

The load sensor may be provided on a bottom wall of the smart container 20 and measures the mass or weight of the contents of the smart container 20. The load sensor measures the presence of the contents.

The temperature sensor is provided to measure the temperature inside and/or outside the smart container 20. The temperature sensor can be used to determine if the smart container 20 is open or closed. For example, if the smart container 20 is closed, the difference in temperature between the inside temperature and the outside temperature may be greater than when the smart container 20 is open. If the smart container 20 is open, the smart container 20 loses insulation and the inside temperature moves towards the outside temperature.

The light sensor is provided measure an amount of illumination inside and/or outside of the smart container 20. The light sensor can be used to determine if the smart container 20 is open or closed. For example, if the smart container 20 is closed, the difference in the amount of illumination between inside illumination and outside illumination may be greater than when the smart container 20 is open. If the smart container 20 is open, more light can enter the smart container 20 and the inside amount of illumination moves toward the outside amount of illumination.

For each sensor, the container application 206 and/or the server 30 includes algorithms to analyze the measurements to verify the presence of contents and to determine indications of tampering. The algorithms may establish a baseline measurement when the contents are locked in the smart container 20 and indicate tampering based on a deviation from the baseline measurement (e.g., a threshold deviation).

The smart container 20 includes a communication module 260 to connect to the communication network 150 and thereby communicate with the nodes of the network 10 including writing to the blockchain 100 or sharing an updated version 90 of the blockchain 100 with the nodes of the network 10.

The communication module 260 can be configured to provide connectivity to wireless computing systems and is configurable for wireless communication between the smart container 20 and other systems, computers, and modules. The communication module 260 generally includes wireless transmission and communication hardware that may be disposed in communication with one or more transceivers associated with telecommunications towers and other wireless telecommunications infrastructure.

For example, the communications module 260 includes a Global Positioning System (GPS) receiver 262 for receiving and processing a GPS signal from a GPS, a Bluetooth® Low-Energy Module (BLEM), a Wi-Fi transceiver, an Ultra-Wide Band (UWB) transceiver, and/or other wireless transceivers.

The GPS receiver 262 is configured and/or programmed to determine a location of the smart container 20. The (GPS) receiver 262 is configured or programmed to triangulate a position or location of the smart container 20 relative to satellites or terrestrial based transmitter towers associated with the GPS. The GPS receiver 262, therefore, is configured or programmed for wireless communication.

The BLEM is configured and/or programmed to receive messages from, and transmit messages to, one or more cellular towers associated with a telecommunication provider, and/or and a Telematics Service Delivery Network (SDN) associated with the smart container 20. The BLEM may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM may include Generic Attribute Profile (GATT) device connectivity for client devices that respond to or initiate GATT commands and requests, and connect directly with a mobile device.

Figure 3:
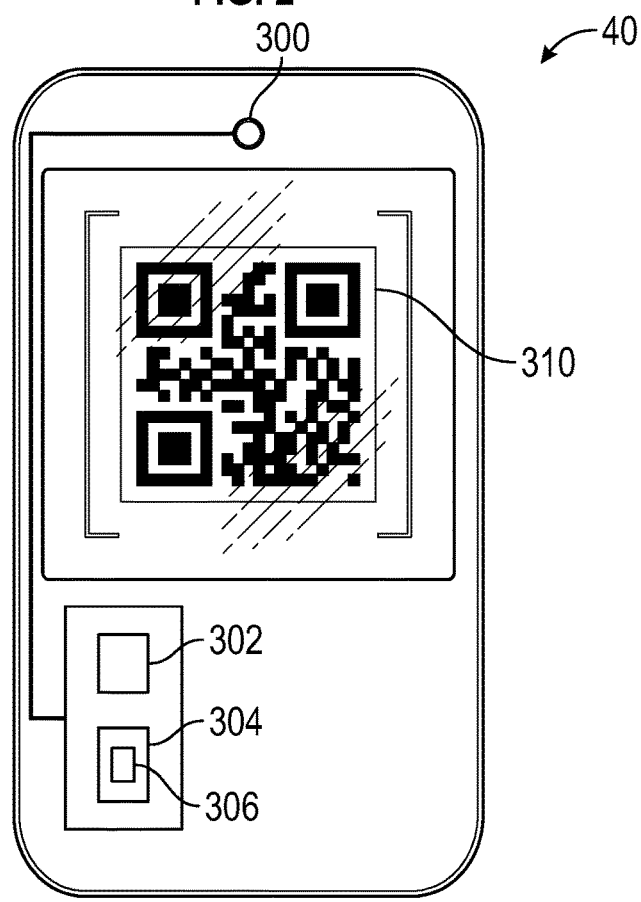
FIG. 3 illustrates an example scanner device in accordance with the present disclosure.

Referring to FIG. 3, the scanner devices 40 include a scanner 300. The scanner 300 may be an image scanner camera, a barcode scanner, a contact scanner, a laser scanner, an imager, a pen-type reader, a camera-based reader, a CCD reader, an omni-directional barcode scanner, combinations thereof, and the like.

The scanner device 40 includes a processor 302, and a memory 304. The memory 304 includes a scanner application 306 including program instructions that, when executed by the processor 302, performs aspects of the disclosed methods including controlling scanning or capturing a visual pattern 310 (e.g., a QR code or bar code), decoding the visual pattern 310 to determine the information encoded in the visual pattern 310, and writing to the blockchain 100 based on the information read from the visual pattern 310. As such, the scanner application 306 may be part of the tracking and tamper detection system 110 described in further detail below or may transmit information for such systems.

The visual pattern 310 is readable by the scanner devices 40 and is used to encode information. The information can include an identification (ID) number of the device or structure on which the visual pattern 310 is located. For example, the information encoded in a visual pattern 310 located on the smart container 20 includes a container ID and the information encoded in a visual pattern 310 on a scanner device 40 includes a scanner device ID.

According to an exemplary method, the scanner device 40 scans the visual pattern 310 on the smart container 20, decodes the visual pattern 310 to determine the container ID, and writes the container ID along with information derived from the scanner device 40 (the scanner ID, the date, the time, the location (e.g., from a GPS receiver 262)) to the blockchain 100 from the blockchain address of the scanner device 40.

In alternative embodiments, radio frequency identification RFID technology can be used in place of scanning technology.

Figure 4:
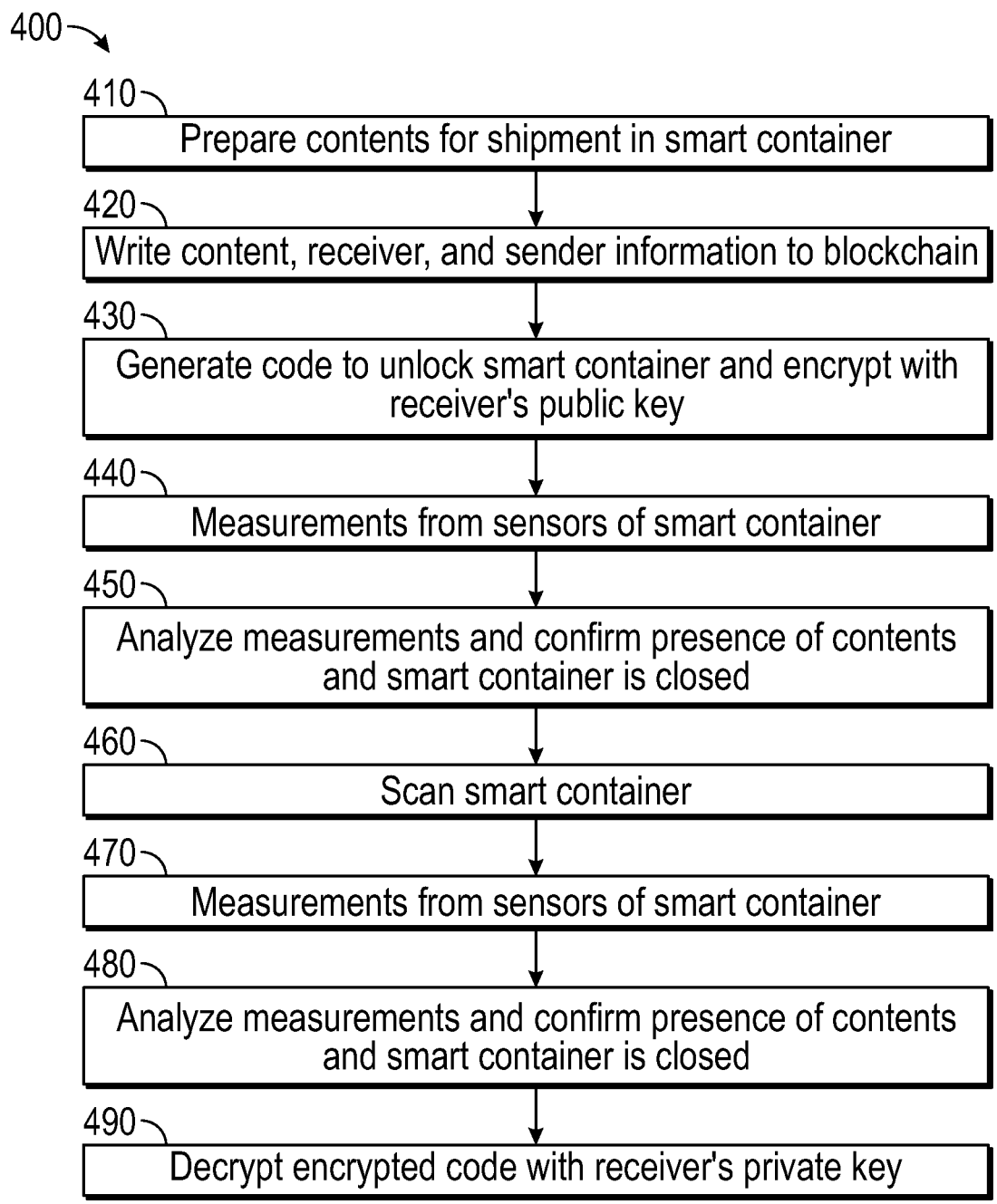
FIG. 4 is a flow chart of an example method of shipping and tracking the smart container in accordance with the present disclosure.

Referring to FIG. 4, the tracking and tamper detection system 110 performs aspects of a method 400 of shipping contents in the smart container 20.

According to a first step 410, the sender 50 prepares contents 412 for shipment in the smart container 20. The sender 50 places contents 412 in the smart container 20, closes the smart container 20, and manually locks the flaps 214, 216 with the lock 220. The ends 232, 234 of the circuit 230 connect to close part of the circuit 230 and power the sensor 240 and/or the sensor 240 can provide measurements of voltage or current.

According to a second step 420, the sender 50 enters information about the contents 412 into the scanner device 40 including a description of the contents 412 and information about the receiver 60. The sender 50 scans the visual pattern 310 on the smart container 20 with the scanner device 40. The scanner device 40 decodes the visual pattern 310 to determine the container ID and writes the container ID, the description of the contents, the information about the receiver 60, and the information about the sender 50 (e.g., the scanner ID) to the blockchain 100.

According to a third step 430, the smart container 20 reads the container ID from the blockchain 100 and, if the smart container 20 is manually locked, the application 206 forces the lock 220 to remain locked. The application 206 reads the information about the receiver 60 and requests the public key 222 of the receiver 60 from the server 30. The application 206 generates a code to unlock the lock 220, encrypts the code with the public key 222, and writes the encrypted code to the blockchain 100 or otherwise transmits the encrypted code to the receiver 60.

Alternatively, the server 30 can read the container ID from the blockchain 100 and notify the smart container 20, for example, according to a smart contract.

According to a fourth step 440, the smart container 20 requests measurements from the sensors 240, 250 to confirm that the contents are present at the start and the container has not been opened (e.g., by force). The smart container 20 writes the measurements to the blockchain 100.

Each time measurements are written to the blockchain 100, according to a fifth step 450, the server 30 may read the measurements and confirm, based on the measurements, that the contents are present (e.g., at the transfer) and the container has not been opened (e.g., by force) or otherwise determine, based on the measurements, that the contents have been removed and/or the container has been opened. The server 30 may write the result of the analysis to the blockchain 100, for example, to establish a record that can help determine the agent responsible for loss of contents or tampering. The server 30 may also, send a confirmation or notification to the scanner device 40 of the current agent of record in the blockchain 100 so that the agent knows to continue with delivery or address a tampering issue if needed.

After the above steps, the smart container 20 is prepared for pickup and delivery to the receiver by one or more agents. Each time the smart container is transferred between the sender 50 and an agent 70, 80, between agents 70, 80, and between an agent 70, 80 and the receiver 60, a series of transfer steps occur to establish the agency of the smart container 20.

According to a sixth step 460, the agent 70 scans the visual pattern 310 on the smart container 20 with the scanner device 40. The scanner device 40 decodes the visual pattern 310 to determine the container ID and writes the container ID and the agent 70 information (e.g., the scanner ID) to the blockchain 100. The smart container 20 reads the container ID from the blockchain 100 and the agent 70 information indicating a change in agency. Alternatively, the server 30 reads or receives the container ID and sends a remote trigger to the smart container 20 to take measurements with the sensors 240, 250 and determine a status of the lock 220.

According to a seventh step 470, the smart container 20 requests measurements from the sensors 240, 250 and a status of the lock 220 to confirm that the contents 412 are present at the transfer and the smart container 20 is locked and has not been opened (e.g., by force). The smart container 20 writes the measurements to the blockchain 100. Additionally or alternatively, the smart container 20 sends the measurements to the server 30.

According to an eighth step 480, the server 30 (or the smart container 20) may read the measurements and confirm, based on the measurements and the status of the lock 220, that the contents 412 are present (e.g., at the transfer) and the smart container 20 is locked and has not been opened (e.g., by force) or otherwise determine, based on the measurements, that the contents 412 have been removed and/or the smart container 20 has been unlocked and opened. Measurements (visual, weight, thermal, etc.) by the sensors 240, 250 of the inside of the container 20 may be analyzed by a tampering detection algorithm as described above.

The server 30 or the smart container 20 may write the result of the analysis to the blockchain 100, for example, to establish a record that can help determine the agent responsible for loss of the contents 412 or tampering. For example, the result of the analysis of the tampering detection algorithm and the coinciding updated chain of custody at least partially define an event that is used to track tampering. The server 30 or the smart container 20 may also send a confirmation or notification to the scanner device 40 of the agent 70 so that the agent 70 knows to proceed with delivery or address a tampering issue if needed.

The steps 460, 470, 480 may repeat for additional transfers between agents (e.g., agent 70 to agent 80). At the final transfer from the agent 80 to the receiver 60, the steps 460, 470, 480 are also repeated. For example, the receiver 60 scans the visual pattern 310 on the smart container 20 with the scanner device 40. The scanner device 40 decodes the visual pattern 310 to determine the container ID and writes the container ID and the receiver 60 information (e.g., the scanner ID) to the blockchain 100. The smart container 20 reads the container ID from the blockchain 100 and the receiver 60 information indicating the delivery.

The smart container 20 requests measurements from the sensors 240, 250 to confirm that the contents 412 are present at the delivery and the smart container 20 has not been opened (e.g., by force). The smart container 20 writes the measurements to the blockchain 100.

The server 30 may read the measurements and confirm, based on the measurements, that the contents 412 are present (e.g., at the delivery) and the smart container 20 has not been opened (e.g., by force) or otherwise determine, based on the measurements, that the contents 412 have been removed and/or the container has been opened. The server 30 may write the result of the analysis to the blockchain 100, for example, to establish a record that can help determine the agent responsible for loss of the contents 412 or tampering. The server 30 may also, send a confirmation or notification to the scanner device 40 of the receiver 60 so that the receiver 60 knows to accept delivery or address a tampering issue if needed.

According to a ninth step 490, if the receiver 60 accepts delivery, the scanner device 40 reads the encrypted lock code from the blockchain 100 and decrypts the lock code with the receiver's private key. The receiver enters the lock code to the lock to unlock the lock 220, opens the container, and accesses the contents. Once the lock code is entered, the smart container 20 writes delivery completion to the blockchain 100 and the smart container 20 is available for another delivery.

Figure 6:
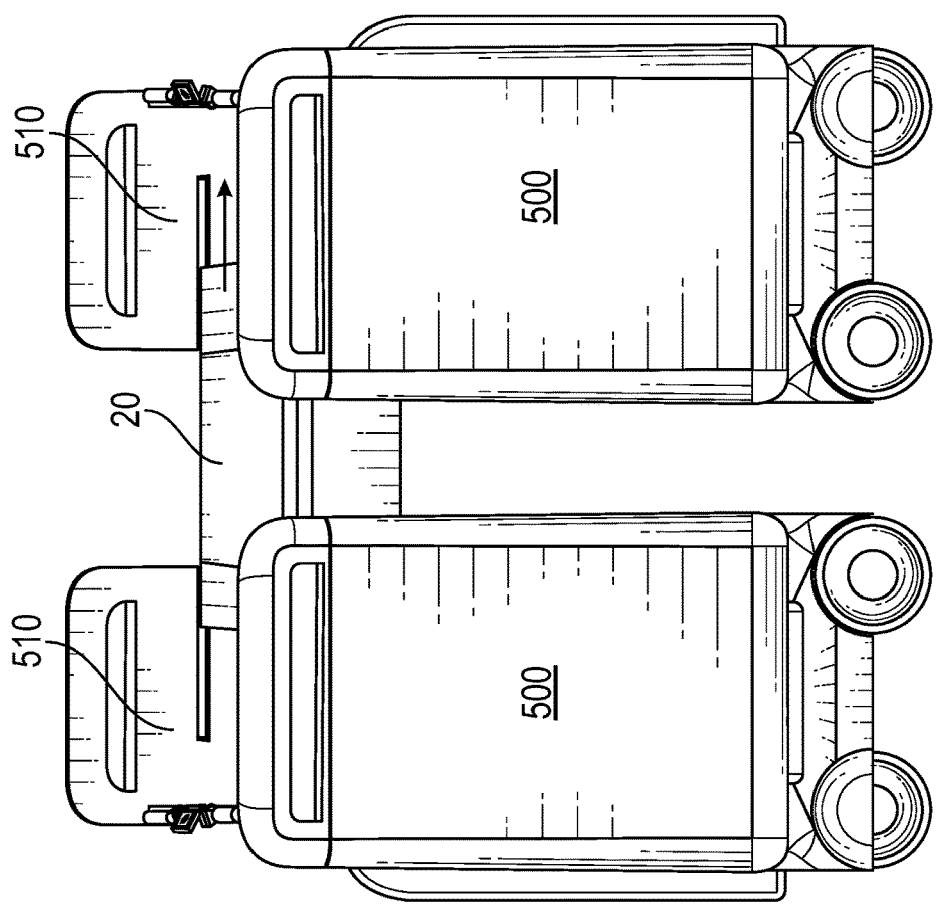
FIG. 6 illustrates a first autonomous delivery vehicle transferring a smart container to a second autonomous delivery vehicle.
Figure 5:
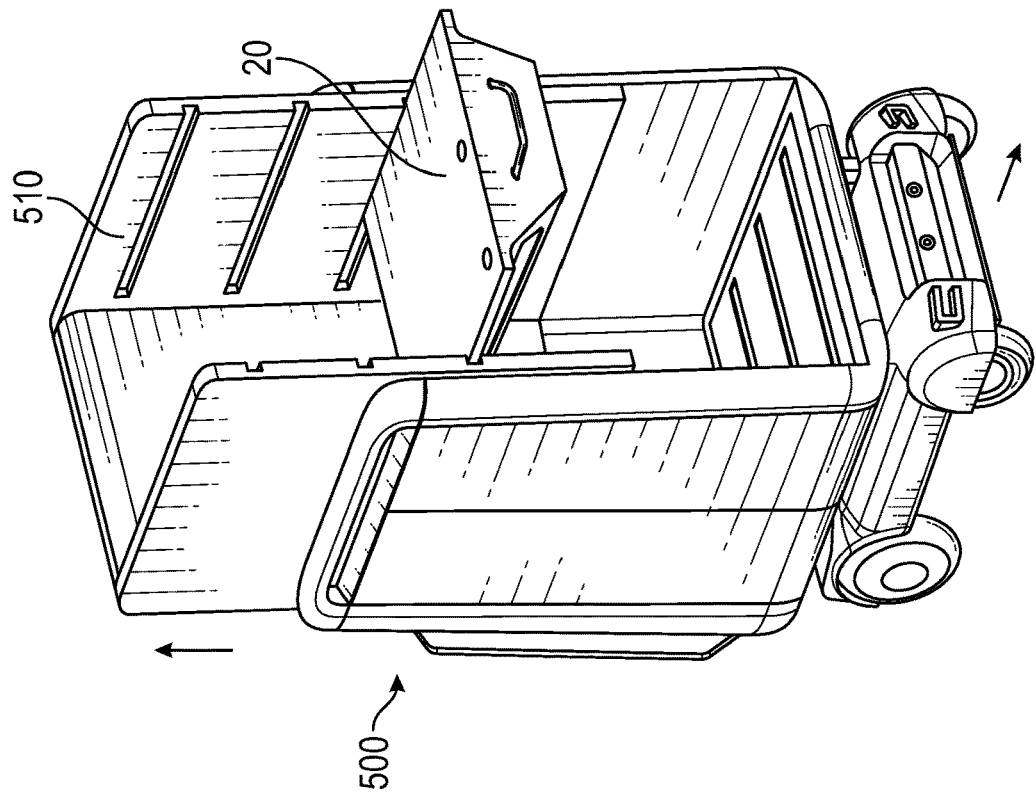
FIG. 5 illustrates an example autonomous delivery vehicle in accordance with the present disclosure.

An agent may be a human with a scanner device 40, an autonomous delivery vehicle 500 with a scanner device 40, and a stationary storage system with a scanner device 40. Referring to FIG. 5, the autonomous delivery vehicle 500 includes a shelf 510 to receive a smart container 20. The smart container 20 may be locked in place on the shelf 510 until another agent writes to the blockchain 100 (e.g., by scanning the smart container 20) to take possession of the smart container 20. For example, FIG. 6 illustrates a first autonomous delivery vehicle 500 transferring the smart container 20 to a second autonomous delivery vehicle 500.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, nonvolatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
    scanning a smart container with a first scanning device and writing an identification of the first scanning device to a blockchain, wherein the smart container and the first scanning device are nodes of a blockchain network, wherein the smart container includes a door;
    writing, in response to scanning the smart container with the first scanning device, a first measurement by a sensor of the smart container to the blockchain, wherein a circuit is associated with the sensor, wherein a first end of the circuit is at a first edge of the door, wherein a second end of the circuit is at a second edge of the smart container, wherein the first end and the second end are in direct electrical contact and the circuit is closed when the door is closed, and wherein the circuit is configured to provide power to the sensor when the circuit is closed; and
    analyzing the first measurement to determine a presence of contents in the smart container.

2. The method of claim 1, wherein scanning the smart container comprises scanning a visual pattern.

3. The method of claim 1, wherein the blockchain network includes a plurality of scanning devices.

4. The method of claim 1, comprising generating an unlock code.

5. The method of claim 4, comprising encrypting the unlock code with a public key of a receiver.

6. The method of claim 5, comprising decrypting the encrypted unlock code with a private key of the receiver.

7. The method of claim 1, comprising:
    scanning the smart container with a second scanning device and writing an identification of the second scanning device to the blockchain, wherein the second scanning device is a node of the blockchain network;
    writing, in response to scanning the smart container with the second scanning device, a second measurement by the sensor of the smart container to the blockchain; and
    analyzing the second measurement to determine a presence of contents in the smart container.

8. The method of claim 1, wherein an autonomous delivery vehicle includes the first scanning device.

9. The method of claim 1, wherein the sensor includes at least one of a load sensor, a temperature sensor, a voltage sensor, a current sensor, combinations thereof, and the like.

10. A smart container, comprising:
    a body comprising an opening;
    a door configured to cover the opening in a closed position; a lock configured to secure the door in the closed position;
    a sensor;
    a circuit associated with the sensor, wherein a first end of the circuit is at a first edge of the door, wherein a second end of the circuit is at a second edge of the smart container, wherein the first end and the second end are in direct electrical contact and the circuit is closed when the door is closed, and wherein the circuit is configured to provide power to the sensor when the circuit is closed;
    an identification of the smart container; and
    a computer, comprising:
    a processor; and
    a memory comprising computer executable instructions that, when executed by the processor, cause the processor to:
        read an entry on a blockchain that indicates the identification of the smart container; and write, based on the door being in the closed position and the circuit providing power to the sensor, a measurement by the sensor to the blockchain.

11. The smart container of claim 10, the memory comprising computer executable instruction that, when executed by the processor, cause the processor to generate an unlock code for the lock.

12. The smart container of claim 11, the memory comprising computer executable instructions that, when executed by the processor, cause the processor to encrypt the unlock code with a public key of a receiver.

13. The smart container of claim 12, the memory comprising computer executable instructions that, when executed by the processor, cause the processor to request the public key of the receiver from a server.

14. The smart container of claim 12, the memory comprising computer executable instructions that, when executed by the processor, cause the processor to receive the unlock code and unlock the lock.

15. The smart container of claim 10, wherein the sensor includes at least one of an optical camera, a load sensor, a thermal camera, temperature sensor, a light sensor, a voltage sensor, a current sensor, combinations thereof, and the like.

16. The smart container of claim 10, comprising a communication module.

17. A smart container, comprising: a body comprising an opening;
 a door configured to cover the opening in a closed position; a lock configured to secure the door in the closed position;
 a sensor; and
 a circuit associated with the sensor, wherein a first end of the circuit is at a first edge of the door, wherein a second end of the circuit is at a second edge of the smart container, wherein the first end and the second end are in direct electrical contact and the circuit is closed when the door is closed, and wherein the circuit is configured to provide power to the sensor when the circuit is closed; and
 a computer, comprising:
 a processor; and
 a memory comprising computer executable instructions that, when executed by the processor, cause the processor to activate the sensor to sense contents in the smart container when the door is locked.

* * * * *